(12) United States Patent  
Schweinzger

(10) Patent No.: US 10,074,466 B2
(45) Date of Patent: Sep. 11, 2018

(54) NTC COMPONENT AND METHOD FOR THE PRODUCTION THEREOF

(71) Applicant: EPCOS AG, Munich (DE)

(72) Inventor: Manfred Schweinzger, Schwanberg (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/120,100

(22) PCT Filed: Feb. 3, 2015

(86) PCT No.: PCT/EP2015/052177
§ 371 (c)(1),
(2) Date: Aug. 18, 2016

(87) PCT Pub. No.: WO2015/124421
PCT Pub. Date: Aug. 27, 2015

(65) Prior Publication Data
US 2017/0250012 A1 Aug. 31, 2017

(30) Foreign Application Priority Data
Feb. 18, 2014 (DE) .................... 10 2014 102 042

(51) Int. Cl.
*H01C 7/04* (2006.01)
*C01G 53/00* (2006.01)
(Continued)

(52) U.S. Cl.
CPC ............ *H01C 7/046* (2013.01); *C01G 53/40* (2013.01); *H01C 1/1413* (2013.01); *H01C 17/07* (2013.01);
(Continued)

(58) Field of Classification Search
CPC ........ H01C 7/046; H01C 17/07; C01G 53/40; C01P 2002/32
(Continued)

(56) References Cited

U.S. PATENT DOCUMENTS 2,645,700 A 7/1953 Morin
3,392,054 A 7/1968 Sapoff et al.
(Continued)

FOREIGN PATENT DOCUMENTS

CN 1624821 A 6/2005
CN 101429655 A 5/2009
(Continued)

OTHER PUBLICATIONS

Jadhav, R. N., et al, "Studies on the Properties of Ni0.6Cu0.4Mn2O4 NTC Ceramic Due to Fe doping", Ceramics International, vol. 38, No. 6, 2012, pp. 5181-5188.
(Continued)

*Primary Examiner* — Kyung Lee
*Assistant Examiner* — Iman Malakooti
(74) *Attorney, Agent, or Firm* — McDermott Will & Emery LLP

(57) ABSTRACT

An NTC component comprising a first electrode (1) and a second electrode (2) is specified. The NTC component further comprises an NTC element (3) disposed between the first electrode (1) and the second electrode (2), wherein the NTC element (3) comprises a ceramic having the general composition $AB_2O_4$, and where A and B each comprise one or more of the materials Mn, Ni, Co and Cu, and B additionally comprises one or more of the materials Fe, Y, Pr, Al, In, Ga and Sb.

12 Claims, 2 Drawing Sheets

(51) Int. Cl.
*H01C 1/14* (2006.01)
*H01C 17/07* (2006.01)
(52) U.S. Cl.
CPC ...... *C01P 2002/32* (2013.01); *C01P 2002/50* (2013.01); *C01P 2006/40* (2013.01)
(58) Field of Classification Search
USPC .......................................................... 338/25
See application file for complete search history.

(56) References Cited

U.S. PATENT DOCUMENTS

| | | | |
|---|---|---|---|
| 4,008,514 A | 2/1977 | Elderbaum | |
| 5,661,094 A | 8/1997 | Feltz et al. | |
| 2012/0043854 A1 | 2/2012 | Otsuka et al. | |
| 2014/0030658 A1* | 1/2014 | Kuroki | C23C 18/1216 430/319 |
| 2015/0132589 A1* | 5/2015 | Fritz | H01L 41/0838 428/457 |

FOREIGN PATENT DOCUMENTS

| | | | | |
|---|---|---|---|---|
| CN | 202281620 | * | 6/2012 | ............ B22F 3/10 |
| CN | 202281620 U | | 6/2012 | |
| DE | 19942176 | * | 3/2001 | ............ C04B 35/01 |
| DE | 19942176 A1 | | 3/2001 | |
| EP | 0609776 A1 | | 8/1994 | |
| EP | 2690194 A1 | | 1/2014 | |
| GB | 1277920 A | | 6/1972 | |
| JP | S61-242002 A | | 10/1986 | |
| JP | S63-315549 A | | 12/1988 | |
| JP | H07-211515 A | | 8/1995 | |
| JP | H08-2962 A | | 1/1996 | |
| JP | H08-55706 A | | 2/1996 | |
| JP | H09306643 A | | 11/1997 | |
| JP | 2008-294326 A | | 12/2008 | |
| JP | 2010-258482 A | | 11/2010 | |
| JP | 2012-134120 A | | 7/2012 | |
| JP | 2013-131596 A | | 7/2013 | |
| WO | 2013167368 A1 | | 11/2013 | |

OTHER PUBLICATIONS

Metzmacher., C. et al., "Indium-Containing Ceramics with Negative Temperature Coefficient Characteristics", Journal of the European Ceramic Society 20, 2000, pp. 997-1002.
Muralidharan, M. N., et al., "Effect of Cu and Fe Addition on Electrical Properties of Ni—Mn—Co—O NTC Thermistor Compositions", Ceramics International, vol. 38, No. 8, 2012, pp. 6481-6486.
Park, K., et al., "Effect of Al2O3 Addition on the Microstructure and the Electrical Stability of MnNiCoO4 NTC Thermistors", Journal of the Korean Physical Society, vol. 49, No. 2, Aug. 2006, pp. 585-590.
Zhang, H. et al., "Preparation and Characterization of Fe3+-doped Ni0.9Co0.8Mn1.3—xFexO4 (0<x<0.7) Negative Temperature Coefficient Ceramic Materials", Microelectronic Engineering, vol. 88, No. 9, 2011, pp. 2934-2940.

* cited by examiner

NTC COMPONENT AND METHOD FOR THE PRODUCTION THEREOF

The present invention relates to an NTC component and to a process for production thereof.

One object to be achieved is that of specifying an improved NTC component or NTC assembly, especially one which is compact and can be produced inexpensively.

This object is achieved by the features of the independent claims. Advantageous configurations and developments are the subject of the dependent claims.

A proposed NTC component comprises a first electrode and a second electrode, and an NTC element disposed between the first electrode and the second electrode. The NTC element appropriately has hot-conducting electrical properties, i.e. a negative temperature coefficient. The NTC element comprises a ceramic having the general composition $AB_2O_4$, where A and B each comprise one or more of the materials manganese (Mn), nickel (Ni), cobalt (Co) and copper (Cu), and B additionally comprises one or more of the materials iron (Fe), yttrium (Y), praseodymium (Pr), aluminum (Al), indium (In), gallium (Ga) and antimony (Sb). The NTC element preferably comprises a spinel ceramic. Advantageously, it is possible via the selection of the materials mentioned to simplify the production process for the NTC component. More particularly, it is advantageously possible by virtue of the materials mentioned, under particular circumstances, to restrict or prevent chemical reduction, for example of the portion B of the composition of the NTC element, during the production of the NTC component. Such a reduction can result in occurrence of unwanted reductive degradation or change in the hot-conducting properties during the production.

The abovementioned circumstances may be a lowered temperature compared to a conventional production or sintering process for NTC components, for example in the presence of a protective gas atmosphere with reduced partial oxygen pressure. In addition, by means of the NTC component presented, in connection with the advantages already mentioned, it is possible to employ alternative advantageous electrode materials, for example base metals such as copper, and hence to produce the NTC component in a less expensive and/or more compact manner overall.

In one configuration, A is a divalent cation and B a trivalent cation. Preferably, A and B are each metal cations. The valency of the cations is preferably based on the oxidation number and/or oxidation state of the particular cation.

In one configuration, the composition of the ceramic is in accordance with the formula $(Mn_t Ni_u Co_v Cu_w)(Mn_x Co_y X_z)_2 O_4$ with $t+u+v+w=1$ and $x+y+z=2$ or with $t+u+v+w\approx1$ and $x+y+z\approx2$, and where the material denoted by the variable X comprises or denotes one or more of the materials Fe, Y, Pr, Al, In, Ga and Sb. The variables t, u, v, w, x, y and z preferably denote atomic or molar proportions of the material or substance indicated by these variables.

By virtue of the content of at least one of the materials Fe, Y, Pr, Al, In, Ga and Sb of portion B of the composition, it is especially possible to prevent or restrict reduction or reductive degradation of the ceramic constituents during the production of the NTC component, such that the sintering of the ceramic at low or comparatively low temperatures is enabled with preservation of the hot-conducting properties of the NTC element, for example under an atmosphere with a reduced partial oxygen pressure.

In one configuration, X represents iron or is equal to iron (X=Fe), where t is selected from [0.2-0.4], u from [0.18-0.38], v from [0-0.15], w from [0.27-0.47], x from [0.63-0.83], y from [0-0.19] and z from [1.07-1.27].

In one configuration, X represents iron or is equal to iron (X=Fe); the further parameters are as follows: $t\approx0.3$; $u\approx0.28$; $v\approx0.05$; $w\approx0.37$; $x\approx0.73$; $y\approx0.09$ and $z\approx1.17$. The expression "$\approx$" (about) in the present context preferably means that the stated parameter or the proportion specified in each case may vary in accordance with the invention in each case by up to +/−20% or deviate by +20% and −20% from its nominal or specified value. Alternatively, the parameter or the proportion may vary by up to +/−10%. More preferably, the parameter or the proportion may vary by up to +/−5%.

In one configuration, the variable z which determines the atomic or molar proportion of the material X in the NTC element is greater than 1 ($z>1$).

In one configuration, the first electrode comprises a layer having a base metal as the main constituent.

Additionally or alternatively, the second electrode may comprise a layer having a base metal as the main constituent. This configuration can, for example, reduce the production costs of the NTC component, since it is advantageously possible to dispense with costly precious metals as electrode materials. In addition, it is possible to prevent or restrict migration of electrode material with respect to Ag-containing electrodes, for example in a moist environment and especially in the case of incorporation of the NTC component into circuits where a voltage, for example a DC voltage, is applied to the component.

In one configuration, the first electrode comprises a layer having copper as the main constituent. Copper as electrode material or as main constituent thereof also offers the advantage of high thermal conductivity, which means that the response characteristics of the NTC component can be improved. Said layer may be a foil, for example a copper foil. This configuration allows the assembly height of the NTC component to be kept small, for example compared to conventional NTC components, since the layer or electrode layer for the first electrode can be provided in particularly compact or thin form as a copper foil. In one configuration, the first electrode forms a stabilization body of the NTC component. The mechanical stability of the NTC component can advantageously likewise be increased by the use of ductile copper as stabilization body.

In one configuration, the first electrode has a layer having a layer thickness between 10 μm and 100 μm.

In one configuration, the NTC element comprises a layer having a layer thickness between 5 μm and 100 μm.

In one configuration, the component has an assembly thickness between 30 μm and 100 μm. The assembly thickness preferably refers to the total thickness of the NTC component as described above, i.e. including the first electrode, the NTC element and the second electrode. In addition, said assembly thickness is preferably measured along the arrangement of the first electrode, the NTC element and the second electrode, or in stack direction of these components.

By virtue of the choice or dimensions of the abovementioned thicknesses, it is advantageously possible to keep the assembly thickness or component thickness of the NTC component small and/or to design the NTC component in a thin layer design and/or a "low-profile" variant. More particularly, it is possible to implement very small designs or small assembly heights. In addition, the small designs offer the option of positioning the components in a space-saving manner beneath other assemblies, for example a circuit board, or even of integrating these into the circuit board. The small designs can further promote passive integration, "embedding" or encapsulation of the NTC component.

In one configuration, at least one of the first and second electrodes consists of 100% copper.

In an alternative configuration, at least one of the first and second electrodes comprises, as well as copper, a glass and/or one or more of the following materials: zirconium oxide, especially $ZrO_2$, aluminum oxide, especially $Al_2O_3$, and magnesium oxide (MgO).

By means of the two latter configurations, it is advantageously possible to dispense with the use of costly precious metals, for example Ag, Pd and/or Au as electrode material.

In one configuration, at least one of the first and second electrodes is free of silver (Ag).

In one configuration, the NTC component has a surface-mountable design. This configuration especially enables exploitation of the advantages of a surface-mountable configuration, for example the possibility of soldering the NTC component directly onto a circuit board or electronic assembly. This configuration is especially advantageous because of the possibility of providing small designs of the NTC component, since it is likewise possible in this case to keep the assembly height of the entire electronic assembly correspondingly small in a likewise advantageous manner.

A further aspect of the present application relates to an NTC assembly comprising a multitude of NTC components arranged in an array, for example alongside one another. By means of this configuration, it is possible, for example, to simplify an integration or arrangement of the NTC component into or in an electronic assembly with additional electronic elements, where a multitude of individual NTC components is advantageous or required. A further aspect of the present application relates to a process for producing the NTC component. The process comprises the bonding of the first electrode, a base material provided beforehand, for example, for the NTC element and/or the second electrode to give a composite, the base material comprising one or more of the materials Mn, Ni, Co and Cu and/or compounds thereof and one or more of the materials Fe, Y, Pr, Al, In and Sb and/or compounds thereof.

As well as the elements mentioned themselves, these may also be present, for example, in the form of oxides or other compounds in the base material. The process further comprises a temperature step in which or wherein the composite is subjected to a temperature, preferably a sintering temperature. In the temperature step, the temperature is selected such that the NTC element is formed from the base material and the base material is sintered to or sintered with the first and second electrodes. "Sintering with" in this context preferably means that the first and second electrodes, as well as the sintering of the NTC element, are also bonded thereto in a mechanically stable manner or sintered together therewith.

The expression "composite" shall preferably mean that the elements mentioned, prior to the temperature step or the subjecting to the temperature, are bonded or arranged together or alongside one another in some way, without any need for there to already be mechanically stable cohesion between the elements.

In one configuration of the process, the material composition of the base material prior to the temperature step is selected such that, during the temperature step, stable oxidation levels or oxidation states of the individual constituents of the base material are present.

By virtue of the composition mentioned, especially by virtue of the content of at least one of the materials Fe, Y, Pr, Al, In, Ga and Sb, the sintering for the NTC component can be effected with simultaneous preservation of the hot-conducting properties, for example under an atmosphere with reduced partial oxygen pressure. The reason for this is that the addition of the latter materials to the abovementioned portion B of the ceramic, which preferably comprises trivalent metal cations, can prevent an excess of the divalent cations, for example, i.e. of the portion A of the ceramic, and hence separation of the corresponding oxides of the divalent cations, for example of nickel oxide. It is thus advantageously also possible to prevent degradation or alteration of the electrical properties of the ceramic. Likewise associated with this, it is conveniently possible to prevent the loss of the hot-conducting properties during sintering. In other words, particularly the intrinsic material properties of the individual constituents or of the material composition of the base material of the invention are responsible for the preservation of the hot-conducting properties or the prevention of said excess during the sintering. Said intrinsic material properties preferably relate to a complex interplay between chemical reactions, for example redox processes, with the physical properties, especially the hot-conducting electronic properties, of the material composition during the temperature step.

In one configuration of the process, the base material comprises a particulate or pulverulent ceramic which is ground prior to the bonding to mean particle sizes or grain sizes of less than 1 µm in diameter. The fine grinding preferably facilitates or enables sintering or densification in the course of sintering, because of the increased surface area and surface energy in relation to the mass of the respective ceramic particle, to give a coherent solid body.

In one configuration of the process, the composite in the case of copper electrodes is subjected to a temperature between 500° C. and 1050° C., preferably between 850° C. and 1050° C. The selection of such a sintering temperature advantageously allows—in the case of copper electrodes—the sintering of the base material or of the NTC element with the first and/or second electrode, since copper does not yet melt under these conditions but is in solid form. The use of copper electrodes is especially advantageous by virtue of the good electrical properties and low costs, and the option of executing the first electrode, for example, as a copper foil, in which case the latter can simultaneously serve as a stabilization body for the NTC component.

The expression "copper electrodes" in the present context preferably means that the respective electrode, i.e., for example, the first and second electrodes, consist of copper or have copper (Cu) as a main constituent.

In one configuration of the process, the composite is subjected to the temperature under a protective gas atmosphere having a partial oxygen pressure of less than 1 µbar.

In one configuration of the process, the composite is subjected to the temperature with a partial oxygen pressure below the partial equilibrium pressure of copper-copper oxide ($Cu/Cu_2O$).

The two latter configurations can conveniently prevent the first and/or second electrode from being substantially or significantly oxidized during the sintering, which would make the electrodes unusable.

In one configuration of the process, the first electrode for the composite is provided or coated with the NTC element by means of screen printing, inkjet printing or film casting. In this configuration, in a convenient manner, the first electrode is first provided and then the NTC element is deposited thereon.

In one configuration, the NTC element, for production of the composite, is applied in structured form to the first electrode, for example in the form of small squares in a noncontinuous layer. In this configuration, the NTC element is preferably provided or applied by means of screen printing.

In an alternative configuration of the process, the NTC element is bonded to the first electrode over a large area or the full area. In this configuration, the NTC element is preferably provided or applied to the first electrode by means of film casting.

In one configuration of the process, the second electrode is structured.

In one configuration of the process, the second electrode is bonded to or applied to or deposited on the NTC element in structured form.

In one configuration of the process, the base material is provided by film casting prior to the bonding of the first electrode, the base material and the second electrode, in which case the NTC element for the composite is coated with the first and second electrodes.

In one configuration of the process, the composite is decarburized at a temperature between 300° C. and 500° C. prior to the temperature step.

In one configuration of the process, the composite, after the temperature step, is provided with at least one further electrode, for example further outer electrodes.

A further aspect of the present application relates to a process for producing an NTC assembly having a multitude of NTC components arranged alongside one another in an array, as described above. These individual NTC components have appropriately been processed in parallel, such that process steps described above for the individual NTC component can apply equally to the NTC assembly.

In one configuration of the latterly described process, the NTC assembly, after the subjecting of the composite to the temperature, is individualized into a multitude of individual NTC assemblies and/or NTC components. The latter NTC assembly is preferably one which in turn has a multitude of NTC components arranged, for example, in a row or in a strip.

A further aspect of the present application relates to the use of the NTC component or the NTC assembly as a temperature sensor or as an inrush current limiter.

Further advantages, advantageous configurations and utilities of the invention are apparent from the description of the working examples which follows, in conjunction with the figures.

Figure 1:
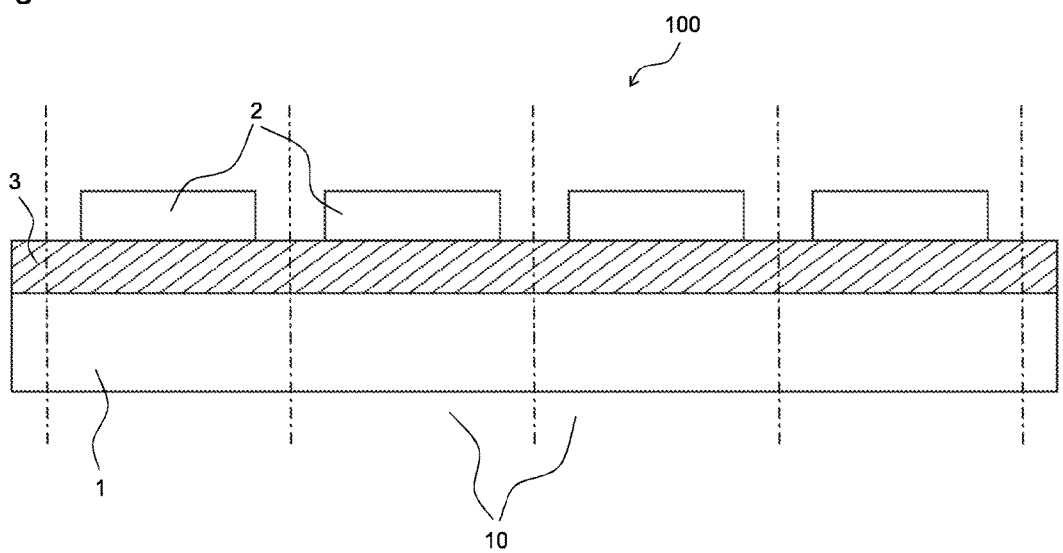
FIG. 1 shows a schematic section view or side view of an NTC assembly.

Elements that are identical, of the same kind and have the same effect are given the same reference numerals in the figures. The figures and the size ratios of the elements shown in the figures with respect to one another should not be regarded as being to scale. Instead, individual elements, for better representation and/or for better understanding, may be shown in an excessively large size.

FIG. 1 shows, in schematic form, a section view or side view of an NTC assembly 100 of the invention. The NTC assembly 100 has a first electrode 1. The first electrode 1 has preferably been provided by film casting.

Alternatively, the first electrode 1 may be deposited or provided by another method, for example by screen printing or electroplating. The first electrode 1 is preferably a layer. The first electrode 1 is preferably, moreover, composed of copper or comprises copper as the main constituent. Preferably, the first electrode is a copper foil. Alternatively, the first electrode may include another base metal as the main constituent. The first electrode 1 preferably forms a stabilization body for the NTC assembly 100.

The NTC assembly 100 also includes an NTC element 3. The NTC element preferably denotes a hot-conducting material or NTC material. The NTC element 3, in FIG. 1, is arranged over a large area of the first electrode 1. Alternatively, the NTC element 3 may be applied to the first electrode 1 in structured form, i.e. only in particular regions. The NTC element 3 may be applied to the first electrode 1, for example, by screen printing, inkjet printing or analogously to an inkjet printing method, or film casting. The NTC element 3 is preferably a layer.

The NTC assembly 100 further comprises a second electrode 2. FIG. 1 shows, by way of example for a multitude of second electrodes 2, a total of four second electrodes 2. The NTC element is appropriately arranged between the first electrode 1 and the second electrode(s) 2. The second electrode 2, in the present case, is applied in structured form as a layer, preferably in a production step to form a multitude of second electrodes 2, for example in square form (cf. FIG. 2). When reference is made hereinafter to the second electrode, reference is preferably made to every single second electrode 2.

The second electrode 2 has preferably been deposited electrolytically or bonded or applied to the NTC element 3 by screen printing.

The first and second electrodes 1, 2 preferably contain copper as the main constituent or consist entirely of copper. Alternatively, the first and second electrodes may include another metal, for example a base metal, as the main constituent. In addition, the first and second electrodes may contain $ZrO_2$, $Al_2O_3$ and/or $MgO$. Preferably, the first electrode 1 and the second electrode 2 do not contain any silver.

The assembly thickness of the NTC assembly 100 is preferably between 30 μm and 100 μm. The thickness of the NTC element is preferably between 5 μm and 100 μm. The thickness of the first electrode 1 is preferably between 10 μm and 100 μm.

FIG. 1 shows the NTC assembly 100 either in a sintered or unsintered state. In the case of the unsintered state, the reference numeral 3 preferably denotes a starting or base material (green part) for the NTC element.

The paragraph which follows briefly discusses the production of an NTC assembly according to the prior art, then the advantages of the present application are described or illustrated thereafter by contrast:

A ceramic formulation or composition for the base material or the NTC element which is known and/or forms part of the prior art relates to a spinel ceramic having the general form or formula $AB_2O_4$ where A denotes a divalent cation and B a trivalent cation. The composition comprises, for example, the individual metal cations Mn, Ni, Co, Cu and Fe with the respective molar or atomic proportions: 1.6992; 0.4572; 0.2328; 0.6108 and 0 (for Fe). For a conventional sintering process with sintering temperatures of typically above 1050° C., taking account of the stability of the individual oxidation states with sintering under air, it is possible to arrive at the following chemical formula or a substantially similar formula (corresponding approximately to the following) for the material of the NTC element: $(Mn_{0.0508}'' \ Ni_{0.2387}'' \ Co_{0.0858}'' \ Cu_{0.6755}'') \ (Mn_{1.8284}''' \ Co_{0.1716}''' \ Fe_0''') \ O_{4.0000}$. The small vertical primes relate to the respective oxidative valency. This material is known and already has widespread use in large volumes (on the tonne scale) for NTC assemblies. After or in the course of the conventional sintering, an excess of the divalent cations arises, such that, for example, 0.2669 molar or atomic part of NiO or about the proportion mentioned is separated out or left over.

According to the invention, after the bonding of the first electrode 1, the base material for the NTC element 3 and the second electrode 2, the composite formed, for the sintering, is exposed to a temperature or subjected to a temperature step, the temperature being selected such that the base material forms the NTC element 3 and the latter or the base material is sintered with the first and second electrodes 1, 2. The sintering temperature is appropriately below the melting point of copper, such that, in accordance with the invention, the advantages of copper as electrode material can be exploited and the electrodes do not melt. Prior to the sintering, the corresponding green parts can be molded into shape and cut to size. Preferably, the composite mentioned, for sintering, is subjected to a temperature between 850° C. and 1050° C. This is effected under a protective gas atmosphere, preferably with a partial oxygen pressure of less than 1 μbar and below the partial equilibrium pressure of copper/copper oxide ($Cu/Cu_2O$), in order to prevent or restrict oxidation.

If the above-described known ceramic material were to be sintered in accordance with the invention, the problem would occur that the elements manganese and cobalt present in the spinel ceramics, which are incorporated into the ceramic at a constant ratio of di- and trivalent cations, would be converted, for example, by reduction from the trivalent to the divalent oxidation state. This would prevent the formation of the requisite hot-conducting phases or properties for the NTC element, or these phases would break down during the sintering process. As a consequence, the NTC material or the NTC element would become a high-resistance material and/or an insulator. More specifically, if the abovementioned known material were to be sintered under reduced partial oxygen pressure, for example below 1 μbar and at lower temperatures, the following composition or a substantially similar composition (roughly this composition) would for example arise: $(Mn_{0.7295}''\ Ni_0''\ Co_{0.1142}''\ Cu_{0.1563}'')(Mn_{1.7716}'''\ Co_{0.2284}'''\ Fe_0''')O_{4.0000}$. The ratio of di- and trivalent cations here is distorted compared to the abovementioned formula or material composition. After or in the course of the sintering, the result is thus an excess of divalent cations or oxides thereof, such that, in this case, for example, 0.6729 molar or atomic part of NiO and 0.7428 molar or atomic part of CuO or about these proportions are separated out or left over.

Here, the excess of divalent cations and the associated separation of the corresponding oxides—compared to the above-described situation—has quintupled. As a result of the degradation, the NTC element or the NTC material has a significantly increased electrical resistance, or has become an insulator with loss of the hot-conducting properties. It is thus no longer suitable in the use for an NTC assembly.

The theoretical finding of the reduction of tri- to divalent cations can be quantitatively ascertained or confirmed either by redox titration or by determination of the loss of mass of the NTC material under reduced partial oxygen pressure.

In order to enable the formation of the desired hot-conducting material phases under these reducing conditions, as required by the process of the invention, it is preferable in accordance with the invention to replace a portion of manganese and/or cobalt with iron or another element having a trivalent oxidation state which is stable, for example redox-stable, under conditions under which the first and/or second electrodes are preferably not substantially oxidized. Iron is always in trivalent form both under the known sintering conditions and under the conditions of the invention (lower temperature and protective gas atmosphere during sintering) and can, because of its similar ionic radius to manganese and cobalt, be incorporated into the spinel ceramic in place of the trivalent Mn and Co cations, without being significantly chemically reduced and degraded in the process of the invention or sintering process. Instead of iron, it is also possible to use another element having a trivalent oxidation state which is stable under the conditions of the invention, for example Fe, Y, Pr, Al, In, Ga and Sb.

In order, in accordance with the invention, to obtain a sufficiently reactive material for the sintering process that sintering is possible at temperatures of 500° C. to 1050° C., the calcinate, i.e. the sample to be sintered, is ground to particle sizes of typically less than 1 μm in mean diameter. This powder is then used to produce either a film slip or a screen-printing paste for further processing.

In FIG. 1, the base material, in accordance with the invention, includes one or more of the materials Mn, Ni, Co and Cu and/or compounds thereof and one or more of the materials Fe, Y, Pr, Al, In, Ga and Sb and/or compounds thereof, such that, as described above, no reduction and degradation of the base material or of the NTC element occurs.

Preferably, the base material, in accordance with the invention, comprises a ceramic having the general composition $AB_2O_4$ where A and B each comprise one or more of the materials Mn, Ni, Co and Cu, and B additionally comprises one or more of the materials Fe, Y, Pr, Al, In, Ga and Sb. A is preferably a divalent cation and B a trivalent cation.

The composition of the ceramic is preferably in accordance with the formula $(Mn_t\ Ni_u\ Co_v\ Cu_w)(Mn_x\ Co_y\ X_z)_2O_4$ with $t+u+v+w=1$ and $x+y+z=2$ or with $t+u+v+w\approx1$ and $x+y+z\approx2$, and where X comprises one or more of the materials Fe, Y, Pr, Al, In, Ga and Sb.

Preferably, X=Fe (iron), $t\approx0.3$; $u\approx0.28$; $v\approx0.05$; $w\approx0.37$; $x\approx0.73$; $y\approx0.09$ and $z\approx1.17$, where "≈" (about) shall mean that the numerical value of the corresponding variable is still encompassed up to a deviation of up to +/−20%, more preferably 10%, from the nominal or stated value of the variable and/or the configuration.

Preferably, X=Fe, where t is selected from [0.2-0.4], u from [0.18-0.38], v from [0-0.15], w from [0.27-0.47], x from [0.63-0.83], y from [0-0.19] and z from [1.07-1.27].

More preferably, X is Fe; $t=0.3021$; $u=0.2787$; $v=0.0473$; $w=0.3723$; $x=0.7336$; $y=0.0946$ and $z=1.1716$, such that the composition of the NTC element, in accordance with the invention, is in accordance with the following formula:

$$(Mn_{0.3021}''\ Ni_{0.2787}''\ Co_{0.0473}''\ Cu_{0.3723}'')(Mn_{0.7336}'''\ Co_{0.0946}'''\ Fe_{1.1716}''')O_{4.0000}.$$

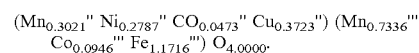

The NTC assembly 100 may also have a surface-mountable design, for example in a multilayer structure. In such a configuration, the composition of the ceramic may be as follows: X is Fe and $t\approx0.371$; $u\approx0.299$; $v\approx0.152$; $w\approx0.400$; $x\approx0.742$; $y\approx0$ and $z\approx1.258$, or $t\approx0.37$; $u\approx0.3$; $v\approx0.15$; $w\approx0.40$; $x\approx0.74$; $y\approx0$ and $z\approx1.26$, where "≈" (about) shall mean that the numerical value of the corresponding variable is still encompassed up to a deviation of up to +/−20%, more preferably 10%, from the nominal or stated value of the variable and/or the configuration.

Especially when another suitable redox-stable material (as described above) is used rather than Fe, it is correspondingly also possible for other molar proportions of the other elements or metal cations to be provided in the ceramic composition of the NTC element.

These embodiments preferably give rise to only a small excess, which is tolerable for the hot-conducting electrical properties, of divalent cations during the sintering of the base material.

In relation to FIG. 1, rather than the first electrode 1, as described above, it is also possible to provide the NTC element 3 first, for example by film casting, and provide it (for the composite) with the first and second electrode 1, 2. For a surface-mountable configuration of the NTC assembly 100, the electrodes 1, 2 may preferably be correspondingly structured, such that the NTC assembly can be soldered, for example, directly onto a circuit board or electronic assembly.

Prior to the temperature step, i.e. prior to the exposure of the composite to the temperature, the composite can be decarburized at a temperature between 300° C. and 500° C. During the decarburization, it is possible, for example, to drive solvents and/or carbon residues out of the green part of the composite or the NTC element.

After the exposure to the temperature, the composite can be provided with at least one further electrode, for example an outer electrode. This may involve first applying the material of the further electrode(s) and then baking it to produce a mechanical bond, for example together with the composite. The further electrode may also be bonded in an electrically conductive manner to the first electrode.

After the sintering or the temperature step, the NTC assembly 100 is preferably individualized into a multitude of NTC components 10. This is indicated in FIG. 1 by the vertical dotted lines 1. The individualization can be effected by sawing, cutting or punching or another method.

Figure 2:
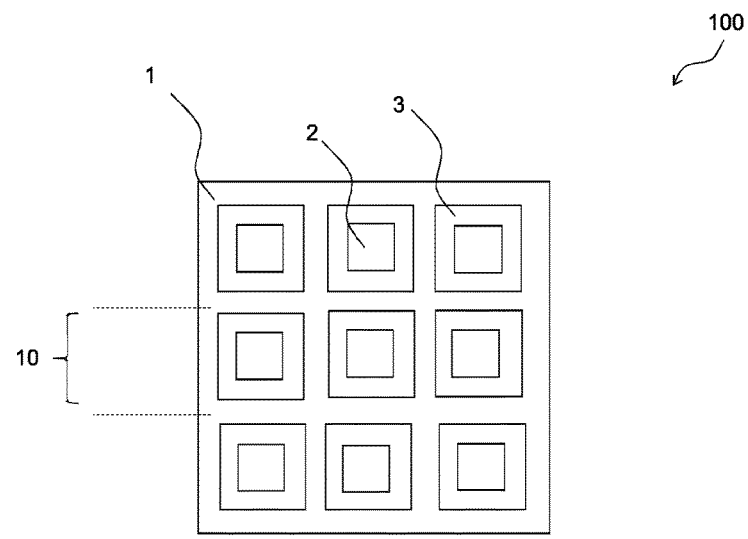
FIG. 2 shows a schematic top view of an NTC assembly.

FIG. 2 shows a schematic top view of an illustrative NTC assembly 100. The NTC assembly 100 has or is formed from a multitude of NTC components 10 arranged in an array. By way of example, an array of 3×3 NTC components is shown. More particularly, the first electrode 1 may be a Cu substrate having a thickness of 50 μm. The NTC elements 3 may be screen-printed thereon for the formation of square NTC components 10 having an edge length of, for example, 2 mm. The second electrodes 2 may be formed from copper and may likewise be square (as shown) with an edge length of 1 mm or round. The layer thickness of the active NTC layers or NTC elements 3 and of the second electrode 2 may in each case be 15 μm. The assembly height of the NTC component here may be 80 μm. Preferably, the NTC assembly 100 has a continuous individual first electrode 1 as electrode layer, which functions as the first electrode for all the NTC components shown. The number of second electrodes 2 corresponds to the number of NTC components 10.

Figure 3:
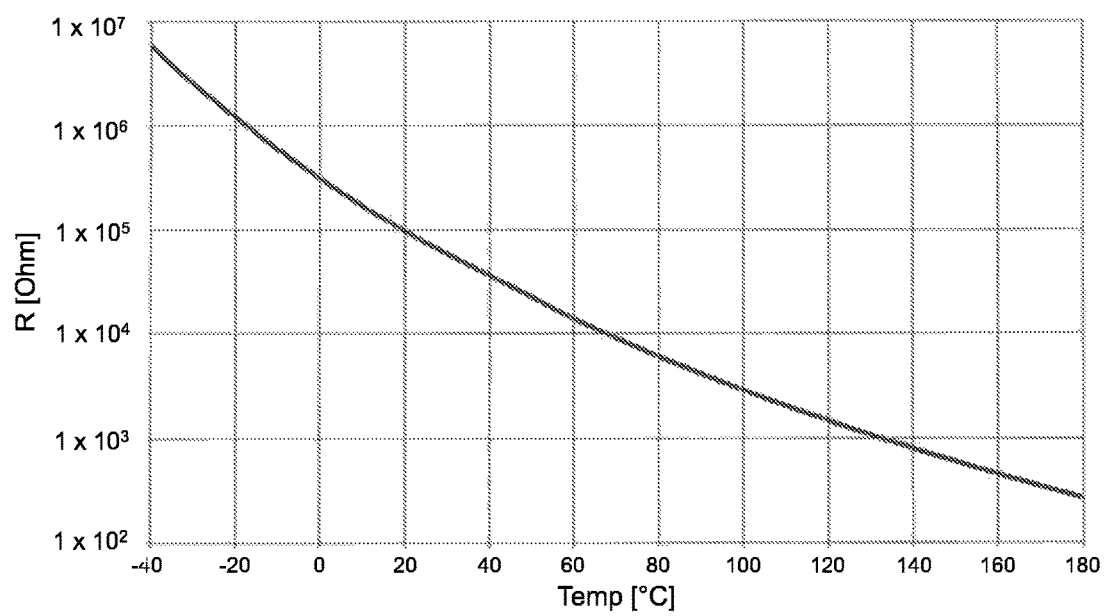
FIG. 3 shows, by way of example, a resistance characteristic for an NTC component.

FIG. 3 shows an illustrative temperature-dependent resistance characteristic of an NTC component 10. The electrical resistance in ohms is plotted logarithmically against the temperature. The temperature range shown extends from −40 to 180° C. At a temperature of 25° C., the electrical resistance is, for example, 70 kohm. The $B_{100}$ value (steepness of the characteristic) is or corresponds to a temperature of 4800 K.

The invention is not restricted by the description with reference to the working examples. Instead, the invention encompasses every new feature and every combination of features, which especially includes every combination of features in the claims, even if this feature or this combination itself is not specified explicitly in the claims or working examples.

LIST OF REFERENCE NUMERALS 1 first electrode
2 second electrode
3 NTC element
10 NTC component
100 NTC assembly

The invention claimed is:

1. An NTC component comprising:
   a first electrode and a second electrode; and
   an NTC element disposed between the first electrode and the second electrode, wherein the NTC element comprises a ceramic having the general composition $AB_2O_4$,
   wherein A and B each comprise one or more of the materials Mn, Ni, Co and Cu,
   wherein the composition of the ceramic is in accordance with the formula $(Mn_t Ni_u Co_v Cu_w)(Mn_x Co_y Fe_z)_2 O_4$ with t+u+v+w=1 and x+y+z=1, and
   wherein t is selected from [0.2-0.4], u from [0.18-0.38], v from [0-0.15], w from [0.27-0.47], x from [0.63-0.83], y from [0-0.19] and z from [1.07-1.27].

2. The NTC component according to claim 1, wherein A is a divalent cation and B a trivalent cation.

3. The NTC component according to claim 1, wherein the first electrode comprises a layer having copper as the main constituent.

4. The NTC component according to claim 1, wherein the first electrode has a layer having a thickness between 10 μm and 100 μm.

5. The NTC component according to claim 1, having an assembly thickness between 30 μm and 100 μm.

6. The NTC component according to claim 1, wherein at least one of the first and second electrodes comprises, as well as Cu, a glass and one or more of the following materials: zirconium oxide, aluminum oxide, magnesium oxide.

7. The NTC component according to claim 1, having a surface-mountable design.

8. A process for producing an NTC component, comprising the following steps:
   bonding a first electrode, a base material and a second electrode to give a composite, the base material comprising one or more of the materials Mn, Ni, Co and Cu and/or compounds thereof and one or more of the materials Fe, Y, Pr, Al, In, Ga and Sb and/or compounds thereof, and
   temperature step in which the temperature is selected such that an NTC element is formed from the base material and the base material is sintered to at least one of the first and second electrodes,
   wherein the NTC element, for production of the composite, is applied in structured form to the first electrode.

9. The process according to claim 8, wherein the base material comprises a particulate or pulverulent ceramic which is ground prior to the bonding to mean particle sizes of less than 1 μm in diameter.

10. The process according to claim 8, wherein the composite in the case of copper electrodes, during the temperature step, is subjected to a temperature between 850° C. and 1050° C. and under a protective gas atmosphere having a partial oxygen pressure of less than 1 μbar and below the partial equilibrium pressure of $Cu/Cu_2O$.

11. The process according to claim 8, wherein the base material is provided by film casting prior to the bonding, and wherein the NTC element for the composite is coated with the first and second electrodes.

12. The process according to claim 8, wherein the composite is decarburized at a temperature between 300° C. and 500° C. prior to the temperature step.

* * * * *